United States Patent [19]

Doepke et al.

[11] 3,885,547

[45] May 27, 1975

[54] REFUELING AND IGNITION GROUNDING DEVICE FOR SMALL ENGINES EQUIPPED WITH A PROTECTIVE HOOD

[75] Inventors: Donald G. H. Doepke, Greenfield; Daniel E. Braun, Brookfield, both of Wis.

[73] Assignee: Briggs & Stratton Corporation, Wauwatosa, Wis.

[22] Filed: Feb. 15, 1974

[21] Appl. No.: 442,871

[52] U.S. Cl. ............... 123/198 D; 56/10.5; 56/17.4; 123/198 DC; 180/82 R; 280/5 A; 141/342
[51] Int. Cl. ........................................... F02b 77/00
[58] Field of Search ................ 123/198 D, 198 DC; 220/85 SP; 56/17.4, 10.5; 141/333, 334, 342; 280/5 A; 180/82 R

[56] References Cited
UNITED STATES PATENTS

| | | | |
|---|---|---|---|
| 1,117,741 | 11/1914 | Wood | 280/5 A |
| 3,057,140 | 10/1962 | Ridenour | 56/10.5 |
| 3,568,421 | 3/1971 | Smith | 56/17.4 |
| 3,750,378 | 8/1973 | Thorud | 56/17.4 |

*Primary Examiner*—Charles J. Myhre
*Assistant Examiner*—R. H. Lazarus

[57] ABSTRACT

An engine for rotary lawn mowers and the like, having a protective and ornamental hood that encloses the engine body and most of the fuel tank, an S-shaped filler spout on the top tank wall swingable between a normal position under the hood and an accessible refueling position. A movable contactor on the spout cooperates with a fixed contact on the fuel tank to ground the engine ignition system when the spout is in refueling position.

9 Claims, 9 Drawing Figures

PATENTED MAY 27 1975

3,885,547

SHEET 1

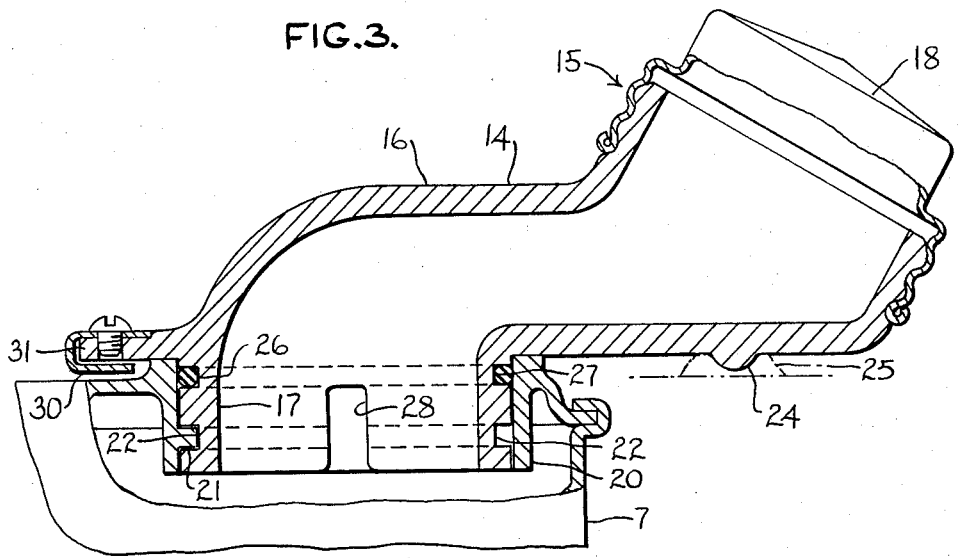
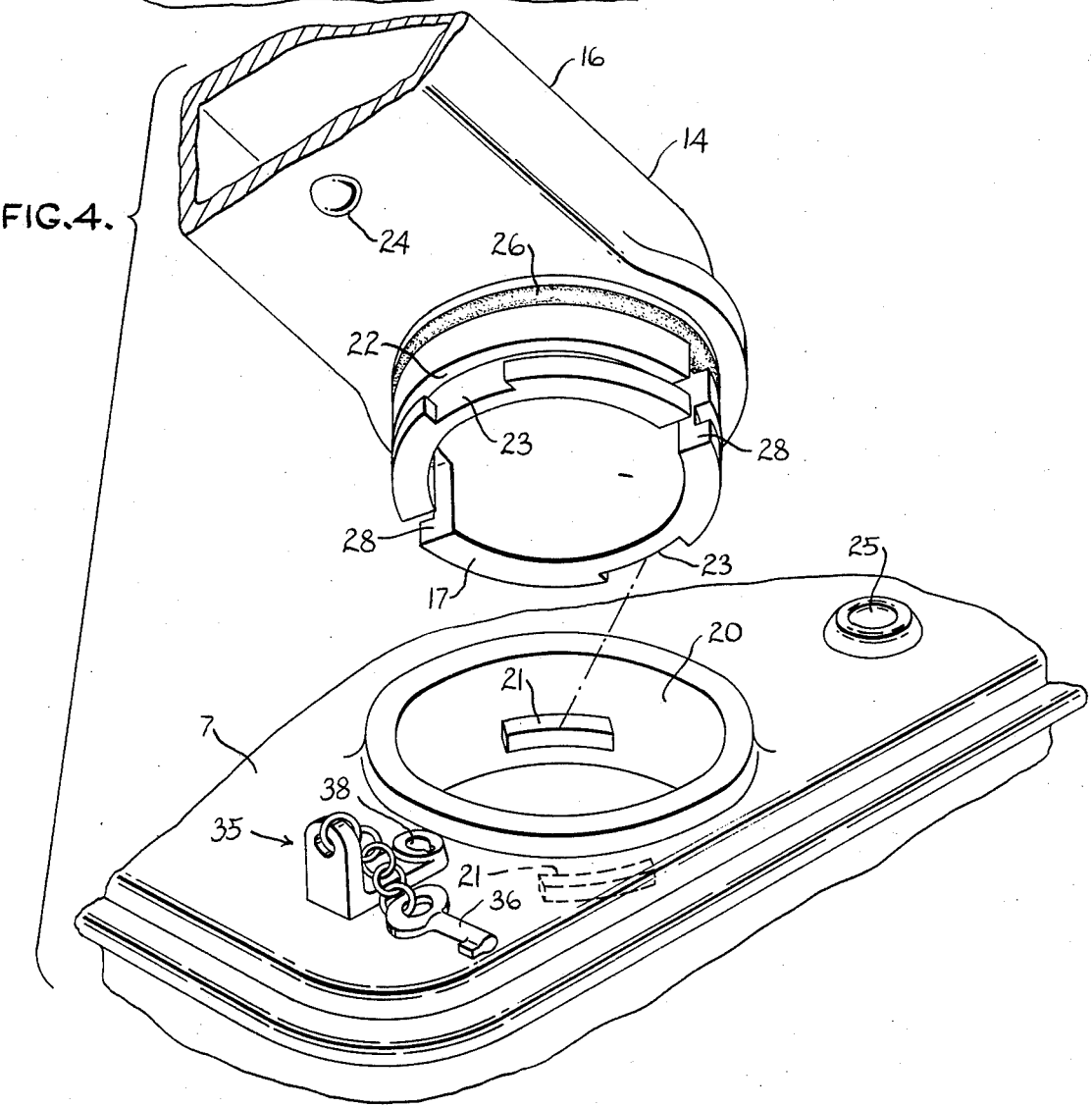

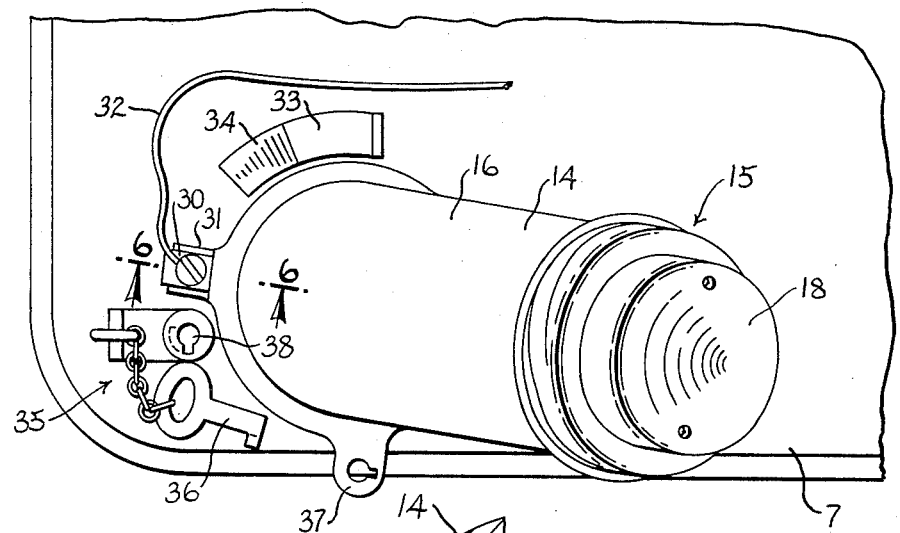
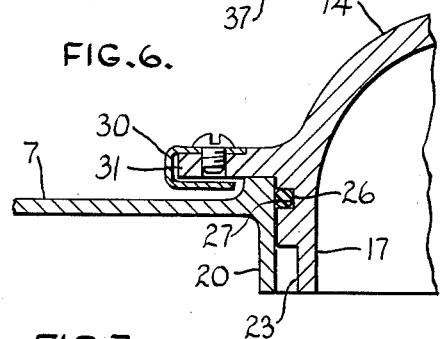
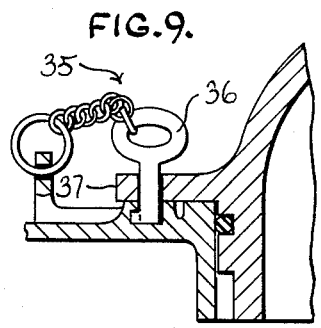
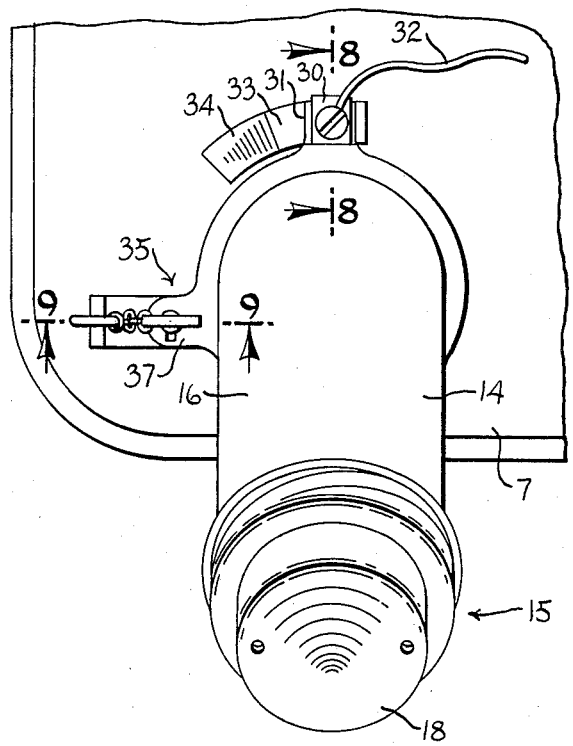

REFUELING AND IGNITION GROUNDING DEVICE FOR SMALL ENGINES EQUIPPED WITH A PROTECTIVE HOOD

This invention relates to small gasoline engines such as are used for powering lawn mowers and similar machines, and is more particularly concerned with means for increasing both the safety and the convenience of refueling such an engine when it is in an installation in which a cover or hood encloses it and extends across its fuel tank.

Many lawn mowers that are powered by small gasoline engines are equipped with a hood that covers and encloses substantial portions of the engine body, the fuel tank and the carburetor. Such an enclosure is perhaps regarded by the mower manufacturer as serving a primarily aesthetic purpose, but it has the safety function of preventing the user's hands and clothing from being caught on projecting parts of the engine, such as the throttle linkage, and it prevents the user from coming in contact with hot parts of the engine such as the cylinder head. Of course the hood also affords a substantial amount of protection to the engine and especially to its externally mounted parts.

For the hood to serve its aesthetic and functional purposes, it had to cover at least a substantial portion of the fuel tank which is conventionally mounted alongside the engine body, closely adjacent to it. In fact it extended over the fuel tank inlet opening and, in so doing, made access to it and its cap awkward and difficult. Without an elongated flexible discharge spout on the fuel can it was virtually impossible to pour fuel into the tank, and even then an indentation in the side of the hood had to be provided to accommodate the flexible filler spout.

With these observations in mind, the present invention has as its object to provide the fuel tank inlet with a simple and inexpensive extension — in effect an inlet or filler spout — that can be swung from a stowed position under the ornamental and protective hood to a refueling position in which its capped inlet opening is not under the hood but readily accessible.

However, the invention has another purpose which is in some respects more important than convenience in refueling. In this aspect, the invention is intended to provide a very important safety feature that effectively forecloses the user from following a dangerous refueling practice.

Everyone knows that an engine should not be refueled while it is running, both because of the obvious fire hazard and because of the danger of coming into contact with moving parts. Nevertheless, there is always a temptation to let the engine run during refueling, in order to avoid the need for restarting it. That temptation is especially strong when the engine is equipped only with a manual starter, so that restarting involves a certain amount of exertion; and manually started engines are very commonly installed on small rotary lawn mowers, in which a rapidly revolving cutting blade presents an especially serious hazard to a person working as close to the machine as is necessary for refueling.

In view of the foregoing, it is another general object of this invention to provide means on an engine of the character described for preventing the engine from running while it is being refueled.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which:

FIG. 3 is a sectional view through the filler spout, shown in its assembled relation to the fuel tank, the view being taken on the plane of the line 3—3 in FIG. 2;

FIG. 4 is a perspective view of the underside of the filler spout and part of the top wall of the fuel tank, to illustrate the manner in which the swivel connection between the spout and the fuel tank is established;

FIG. 5 is a top view of the fuel tank with the filler spout in its normal stowed position, and illustrating the engine ignition grounding switch in its open condition;

FIG. 6 is a detail sectional view through FIG. 5 on the plane of the line 6—6;

FIG. 7 is a view similar to FIG. 5 but with the filler spout swung out to its refueling position and the grounding switch closed;

FIG. 8 is a detail sectional view through FIG. 7 on the plane of the line 8—8; and FIG. 9 is a detail sectional view through FIG. 7 on the plane of the line 9—9.

Figure 1:
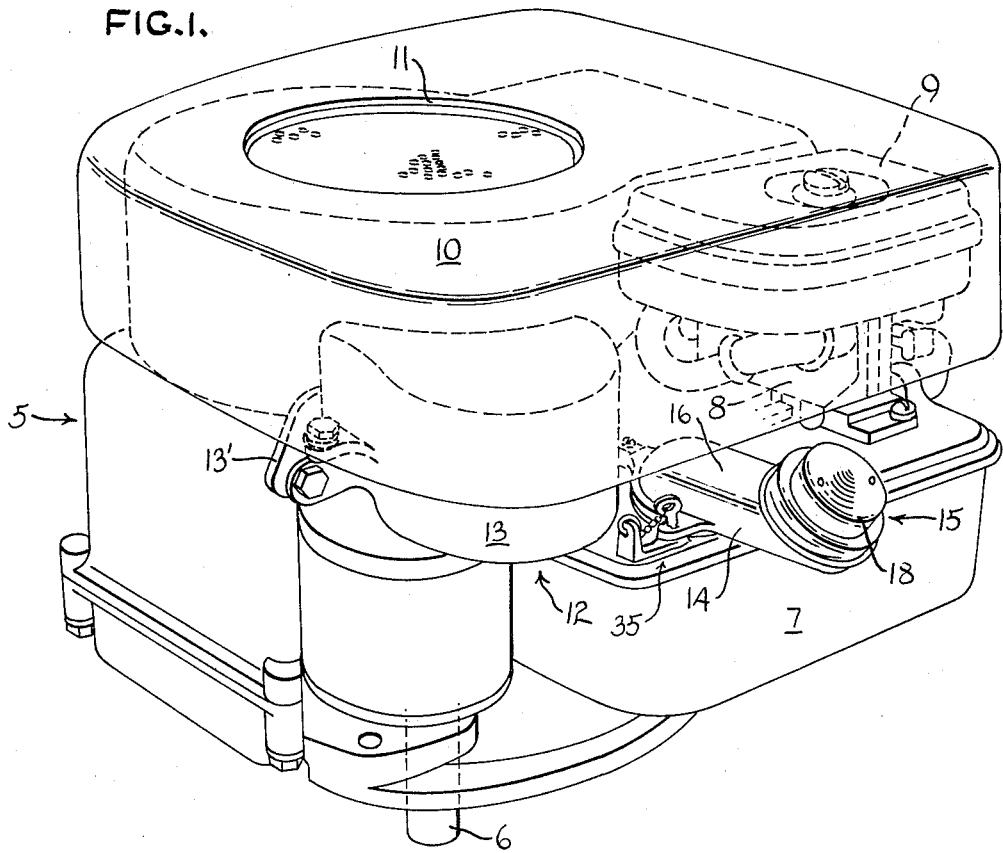
FIG. 1 is a perspective view of an engine which incorporates the present invention and is equipped with a protective and ornamental hood, the inlet or filler spout for the fuel tank being shown swung out to its refueling position.

Referring now to the accompanying drawings, the numeral 5 designates generally a single-cylinder gasoline engine of the type commonly used to power rotary lawn mowers. Accordingly, the engine has a vertical crankshaft with a downwardly projecting power takeoff end portion 6 to which the rotary cutter blade is connected when the engine is assembled with a lawn mower.

Fixed to the engine body and extending alongside its cylinder, closely adjacent thereto, is a fuel tank 7. A carburetor 8 is mounted on top of the fuel tank and an air cleaner 9 is in turn mounted on the top of the carburetor body. Since the engine is intended for installations requiring it to be virtually covered, a hood 10 is mounted thereon. This hood covers the entire engine, including the carburetor, air cleaner and fuel tank, but has a hole 11 in line with the screened air inlet to the blower housing of the engine. The engine illustrated is equipped with a battery powered electric starter of the type forming the subject matter U.S. Pat. No. 3,526,146, the motor and Bendix driving mechanism of which (indicated by the numeral 12) are mounted on the engine by means of a bracket 13 bolted to its crankcase and to an arm 13' projecting therefrom.

In accordance with the present invention, the fuel tank 7 of the engine is provided with a filler spout 14 that swings between a normal or stowed position in which it is essentially covered by the hood 10, and a refueling position (shown in FIG. 1) in which the inlet end of the filler spout is uncovered and readily accessible. When in its stowed position, the outer or inlet end portion of the filler spout is obstructed by the hood making it impossible to fill the tank, but sufficiently accessible to be readily grasped and swung to its refueling position.

The filler spout 14 is generally S-shaped, with an upwardly projecting and upwardly opening inlet or outer end portion 15, an elongated horizontally extending medial portion 16, and an inner end or outlet portion formed by a downwardly projecting cylindrical neck 17. The outer end portion 15 of the filler spout is threaded to receive a conventional screw-on cap 18.

The cylindrical neck 17 which forms the inner end portion of the filler spout is rotatably received in a closely fitting collar 20 that is integral with the top wall of the fuel tank 7. The filler spout is thus swingable about the axis of the collar 20.

To hold the filler spout in place on the top wall of the fuel tank, there is a bayonet connection between them comprising a pair of diametrically opposite lungs 21 projecting inwardly from the collar 20 into an annular groove 22 encircling the neck 17 that forms the inner end portion of the filler spout. Gateways 23 leading from the bottom of the cylindrical neck 17 to the groove 22 provide for entry of the lugs 21 into the groove.

Figure 2:
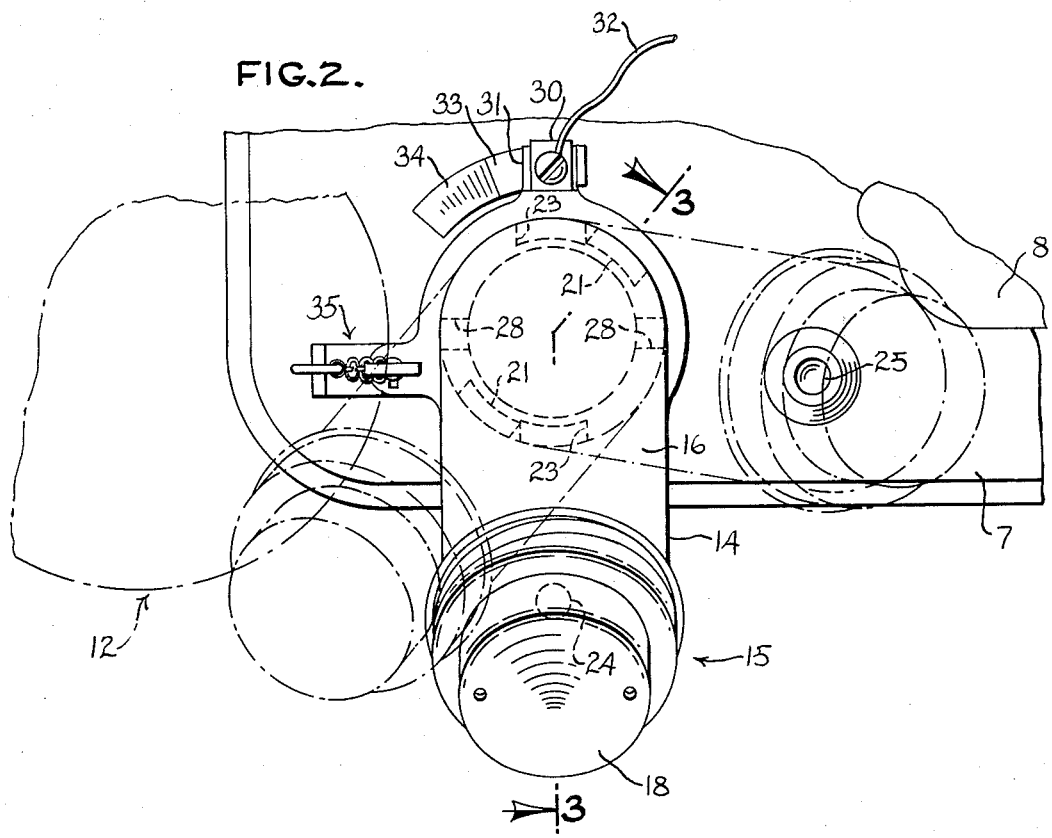
FIG. 2 is a top view of that portion of the fuel tank at which the filler spout is located, with portions of the engine that are adjacent to the filler spout indicated in light lines.

As will appear from FIG. 2, the locations of the gateways 23 with respect to the edges of the top wall of the fuel tank and the locations of the lugs 21 with respect to the longitudinal dimension of the filler spout, are such that assembly and disassembly of the filler spout with the fuel tank requires the filler spout to be in a position beyond the one it occupies for refueling; but that positional relationship between the filler spout and the fuel tank cannot be effected once the engine is assembled and the starter mechanism is in place. Counterclockwise motion of the filler spout is positively limited by its collision with the body of the carburetor 8, and clockwise rotation any substantial distance beyond its refueling position is prevented by the starter structure 12. It follows, therefore, that the filler spout must be assembled with the fuel tank before the starter mechanism is mounted on the engine.

While collision of the filler spout with the starter structure and the carburetor body positively defines the limits of the range of swinging motion which the filler spout has, its normal or stowed position is preferably defined by a detent formed by interengageable abutments 24 and 25 on the bottom of the filler spout and top of the fuel tank, respectively. Unwanted movement of the filler spout out of its stowed position as a result of engine vibration or other causes is thus averted.

To seal the connection between the filler spout and the top wall of the fuel tank, an O-ring 26 is confined between the bottom of a circumferential groove 27 encircling the cylindrical neck 17 and the inner surface of the collar 20.

It will be noted that the collar 20 projects a distance downwardly into the interior of the fuel tank to allow the filler spout to have a low overall height and still have a good swivelling and sealing connection with the fuel tank. However, in the absence of some provision for venting the upper portion of the fuel tank, the downwardly projecting collar would form an air trap that would prevent fuel from rising in the tank to a level above the bottom edge of the collar. Such venting is provided for by means of one or more notches 28 in the neck 17 that extend from its bottom edge and communicate with the annular groove 27 in which the O-ring 26 is located.

Almost invariably, a small engine of the type to which the present invention is applicable has a magneto ignition system and can be stopped by grounding one terminal of its magneto, that is, by electrically connecting that terminal with the body of the engine or with metal parts connected with the engine body. To prevent refueling of the engine while it is running, the present invention provides a magneto grounding switch that is open when the filler spout is in its normal stowed position and is closed in consequence of movement of the filler spout out of that position.

As shown in FIGS. 5–8, the ignition grounding switch comprises a movable contactor 30 carried on an integral radially projecting lug 31 on the inner end portion of the filler spout. The movable contactor is connected with the grounding terminal (not shown) of the magneto by means of a supple conductor wire 32. As the movable contactor swings back and forth with the filler spout, it is carried into and out of engagement with a fixed contact 33 that is secured to or may be an integral part of the top wall of the fuel tank. Since the fuel tank is made of metal, the fixed contact is grounded so that engagement of the movable contactor therewith grounds the ignition circuit.

The fixed contact extends around a short arc that is concentric to the axis about which the filler spout swings, and it is so disposed with relation to the movable contactor 30 that the latter engages it when the spout is in and near its refueling position. Since the fixed contact 33 is at an elevation above the top surface of the fuel tank, an arcuate ramp 34 is provided to guide the movable contactor up onto the fixed contact as the spout is swung towards its refueling position.

To guard against accidental shifting of the filler spout out of its position preventing operation of the engine, a latching means — indicated generally by the numeral 35 — is provided. Although this latching device could take many different forms, a simple embodiment thereof comprises a pin 36 projectable through a hole in an ear 37 on the inner end portion of the filler spout and into a socket 38 in the top of the fuel tank. If desired, the pin 36 may take the shape of a key, in which event the hole in the ear 37 and also the mouth of the socket 38 would have to be key-shaped, and a reentrant pocket at the bottom of the socket 38 would allow the key-shaped pin to be turned to a position making its retraction a bit more difficult for small children.

From the foregoing description taken with the accompanying drawings, it will be apparent that this invention provides means for facilitating the refueling of a small engine that has a hood overlying most of its fuel tank, and for insuring that the fuel tank will not be filled while the engine is running.

Those skilled in the art will appreciate that the invention can be embodied in forms other than as herein disclosed for purposes of illustration.

The invention is defined by the following claims:

1. The combination of a small engine, a fuel tank for the engine mounted on the engine body at one side thereof, and a hood that covers substantial portions of the engine body and the fuel tank, said combination being characterized by:
   A. a filler spout having spaced apart inlet and outlet ends; and
   B. means connecting the outlet end of the filler spout with the fuel tank for swinging of the filler spout through a range of motion between a stowed position in which the inlet end of the filler spout is disposed substantially wholly beneath the hood, and a refueling position in which the inlet of the filler spout is not covered by the hood.

2. The combination of claim 1, wherein the filler spout is substantially S-shaped so that its inlet and outlet ends face in opposite directions.

3. The combination of claim 1, wherein the fuel tank has a top wall upon which the filler spout is mounted, and wherein the engine has parts that are fixed with respect to the fuel tank when the latter is in place on the engine, further characterized by:
   C. said fixed parts of the engine being so located with respect to the mounting of the filler spout that they are engageable by the filler spout as it is swung about its connection with the fuel tank,
      whereby said fixed parts of the engine define the limits of said range of swinging motion of the filler spout; and
   D. said means connecting the outlet end of the filler spout with the fuel tank comprising cooperating means on the filler spout and the top wall of the fuel tank providing a bayonet connection that is engageable and disengageable only when the filler spout is in a position of swinging motion relative to the fuel tank that lies outside said range.

4. The combination of claim 3, further characterized by cooperating detent means on the filler spout and on the top wall of the fuel tank for releasably holding the filler spout in its stowed position.

5. The combination of claim 1, wherein the means connecting the outlet end portion of the filler spout with the fuel tank comprises:
   1. a cylindrical collar on the top wall of the fuel tank;
   2. a downwardly projecting cylindrical neck defining the outlet end portion of the filler spout, said neck being rotatably received in the cylindrical collar;
   3. a sealing ring confined between the neck and the collar; and
   4. cooperating circumferentially extending abutment means on the collar and the neck holding the same against separation except when the filler spout is swung to a position outside of its said range of motion.

6. The combination of claim 1, wherein the engine has a magneto ignition system that can be grounded to the engine body to prevent the engine from running, further characterized by:

C. an ignition grounding switch; and
   D. means responsive to motion of the filler spout to its refueling position to effect closure of said switch.

7. In a small engine having a magneto ignition system with a grounding terminal that can be electrically connected to the engine body to prevent the engine from running, and having a fuel tank secured to the engine body at a location alongside the same, and wherein the top portion of the fuel tank is substantially inaccessible, means for facilitating safe refueling, comprising:
   A. a substantially S-shaped filler spout having a cylindrical, downwardly opening inner end portion and an upwardly opening outer end portion;
   B. cooperating means on the top of the fuel tank and the inner end portion of the filler spout rotatably mounting the filler spout for swinging motion between a normal position in which its outer end portion is substantially inaccessible and a refueling position in which said outer end portion is readily accessible;
   C. switch means on the top of the fuel tank connected with said grounding terminal to ground the same when the switch means is closed; and
   D. switch actuating means on said filler spout operable to effect closure of said switch means as the filler spout is swung to its refueling position.

8. In an engine of the type having a fuel tank mounted adjacent to the engine body and having a magneto ignition system with a grounding terminal that can be electrically connected to the engine body to prevent the engine from running, safety means for assuring that the engine cannot run while the fuel tank is being filled, said safety means comprising:
   A. a substantially elongated filler spout having an inlet end and an outlet end;
   B. cooperating means on the inlet end portion of the filler spout and on a wall of the fuel tank mounting the filler spout for swinging motion relative to the fuel tank between a stowed position in which the inlet end portion of the filler spout is substantially inaccessible and a refueling position in which said inlet end portion is accessible,
      said means also providing for communication between the interior of the filler spout and the interior of the fuel tank; and
   C. means providing an ignition grounding switch electrically connected with said grounding terminal and operatively associated with said filler spout to effect closure of said ignition grounding switch upon motion of the filler spout out of its stowed position.

9. The structure defined by claim 7, further characterized by:
   latch means to hold the filler spout in its refueling position.

* * * * *